Figure 1:
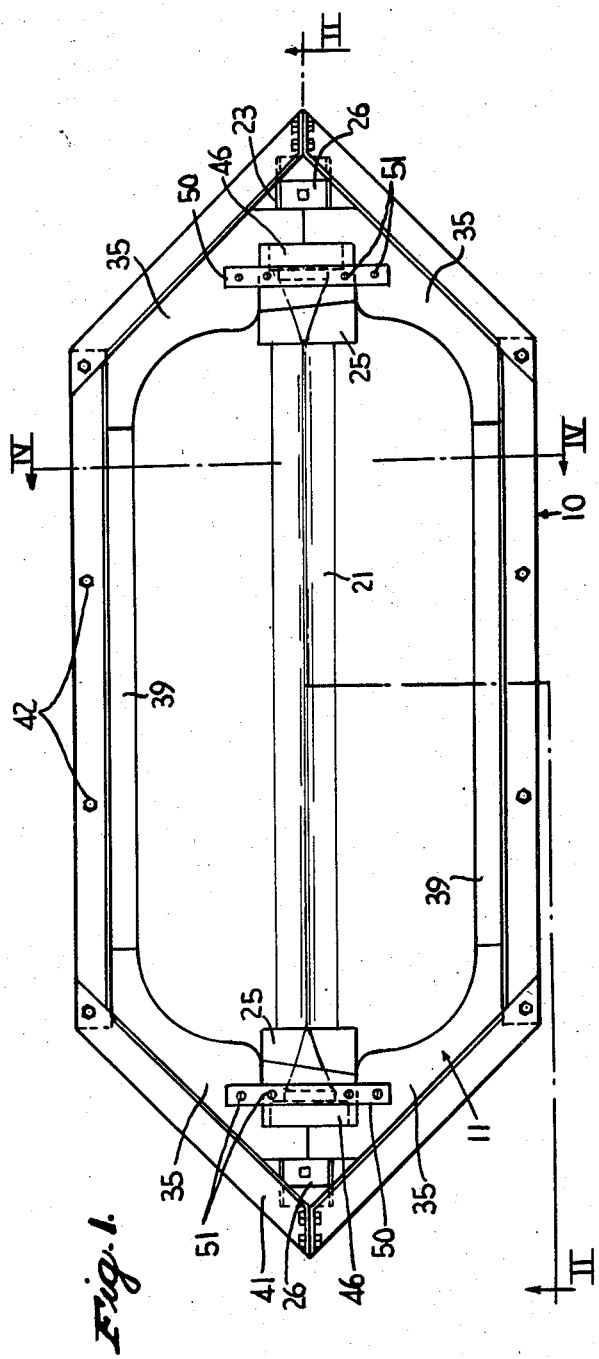

Sept. 2, 1958  J. M. LAMBIE  2,849,779
APPARATUS FOR FORMING REFRACTORY BODIES
Filed Dec. 15, 1955  2 Sheets-Sheet 1

INVENTOR.
JAMES M. LAMBIE
BY Oscar L. Spencer
ATTORNEY.

Sept. 2, 1958  J. M. LAMBIE  2,849,779
APPARATUS FOR FORMING REFRACTORY BODIES
Filed Dec. 15, 1955  2 Sheets-Sheet 2
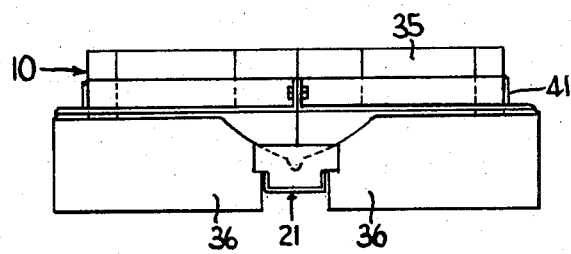
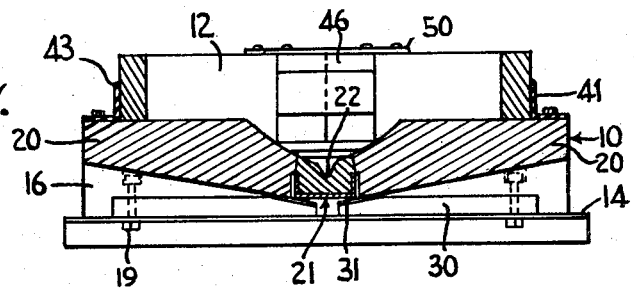
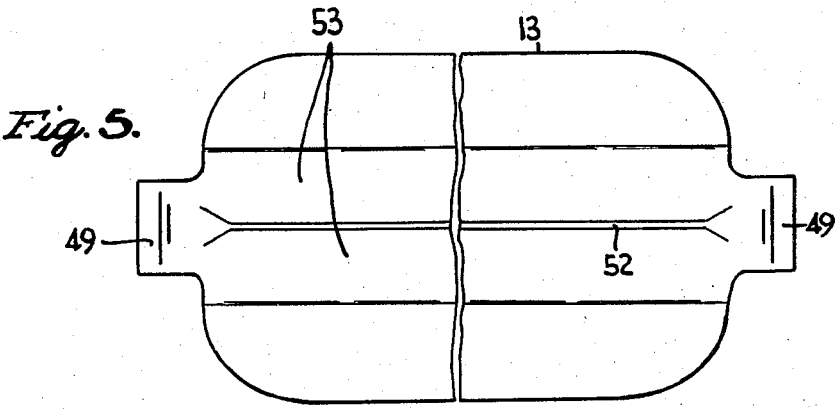
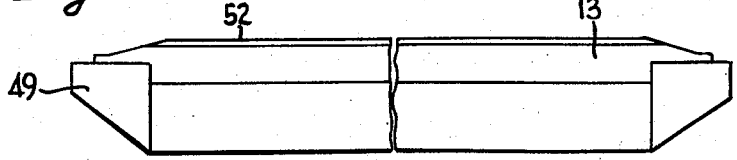
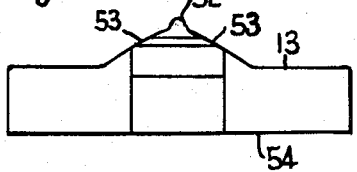
INVENTOR.
JAMES M. LAMBIE
BY
Oscar L. Spencer
ATTORNEY.

United States Patent Office 2,849,779
Patented Sept. 2, 1958

2,849,779

APPARATUS FOR FORMING REFRACTORY BODIES

James M. Lambie, Washington, Pa., assignor to Pittsburgh Plate Glass Company, Allegheny County, Pa., a corporation of Pennsylvania Application December 15, 1955, Serial No. 553,246

4 Claims. (Cl. 25—129)

This invention relates to the formation of refractory bodies, and it has particular relation to apparatus for molding and treating refractory bodies of special forms.

One object of the invention is to provide an improved mold for forming and treating refractory bodies molded from clay products so as to render them initially formed to proper shape for direct use without requiring surface finishing operations.

Another object of the invention is to provide an improved mold structure for molding a refractory body from clay products and controlling the drying and curing of such body after it has been molded.

Another object of the invention is to provide an improved mold structure for receiving wet moldable clay products to be formed in said mold structure into a predetermined finished form of refractory body.

The immediate problem to which the invention is directed is involved in the manufacture of refractory bodies upon which permanent projections and ribs are formed. An example of this type of refractory is the so-called draw bar which is submerged in molten glass and above which sheet glass is drawn. The draw bar serves to stabilize the sheet glass in its formative period and to define the plane of drawing as the sheet is formed and proceeds upwardly from the molten glass to drawing rolls between which it is directed upwardly.

In one form of such draw bar a relatively narrow rib is formed longitudinally thereof and along a central portion of a larger convex ridge which is flanked by opposite horizontal wings of less thickness. This draw bar is in slab form and lies substantially horizontally in the molten glass with the rib facing upwardly in its normal position. Relatively narrow projections at opposite ends of the draw bar are suitably mounted to carry the draw bar body properly anchored in a drawing chamber. The bottom side of the draw bar is relatively flat. An example of this type of especially shaped refractory body is disclosed in U. S. Patent No. 2,303,805 dated December 1, 1942. It is to be understood that the invention can be applied to other types of refractories having special shapes that may involve molding and curing operations in a manner comparable to the molding and curing operations of the draw bar.

In manufacturing draw bars of this type, it has been the practice to cast or mold a slab of refractory more or less generally to the shape required. Then surface dressing by grinding and carving was necessary to form the central longitudinal rib and the contour of the ridge portions sloping downwardly from and flanking the central rib. These operations entailed not only a great deal of exacting work but, because of the natural characteristics of the refractory or clay products of which the draw bar was formed, the ground and carved surface texture was grainy and somewhat abrasive as opposed to a smooth or polished surface. Such grainy surfaces have certain disadvantages with reference to contact with molten glass because the glass has a tendency to pick up particles and impurities therefrom.

According to the invention disclosed herein, a batch of wet clay products is poured into a mold matrix composed of plaster of Paris the surfaces of which are very smoothly and precisely formed. An example of the type of clay products adaptable for molding refractory bodies of the type under consideration can be found in U. S. Patent 2,543,548, dated February 27, 1951. A mold designed for purposes of this invention is sectional and is of knock-down construction. Its sectional parts are assembled in such manner that the sections can be disassembled and withdrawn selectively to coordinate the removal of the individual sections according to the rates and manner of drying and curing the refractory body after it has been cast.

Figure 2:
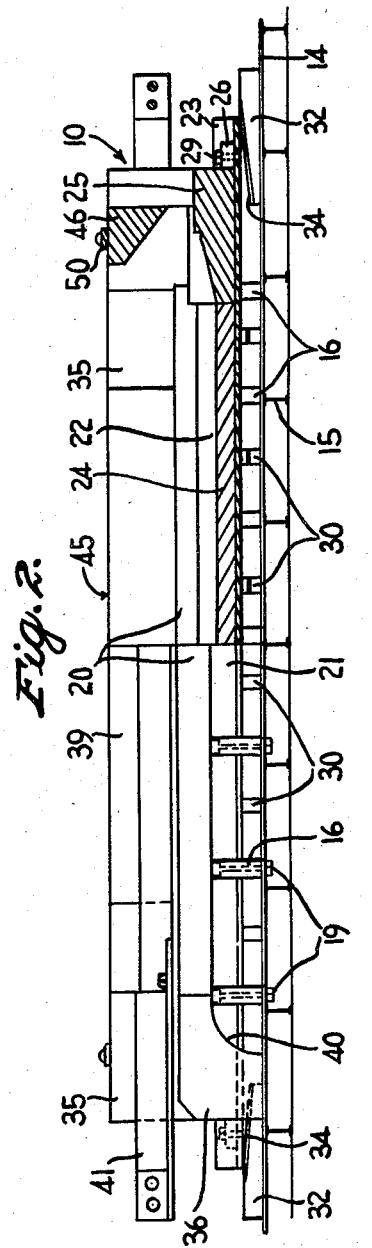

In the drawing:

Fig. 1 is a plan of a mold structure in which clay products are to be formed into a refractory body of predetermined shape; Fig. 2 is a side view partially in elevation and partially in vertical longitudinal section taken substantially along the line II—II of Fig. 1; Fig. 3 is an end elevation of the mold structure shown in Fig. 1, but with portions of the supporting structure omitted; Fig. 4 is a cross section taken substantially along the line IV—IV of Fig. 1; Fig. 5 is a fragmentary plan of a draw bar which has been molded or cast in the mold structure shown in Figs. 1 to 4; Fig. 6 is a fragmentary side elevation of the draw bar shown in Fig. 5; and Fig. 7 is an end elevation of the draw bar shown in Fig. 5.

In one form of the invention, a mass of wet clay products of such consistency that it can be poured, is deposited by pouring it into a mold structure 10, which includes a mold matrix 11. This matrix is open at the top and defines an upwardly facing cavity 12 of such shape as desired to produce a refractory body 13 of particular contour. As indicated above, in one application of the invention, the form of the finished refractory is that of a so-called draw bar which is employed in the drawing chamber of a sheet glass drawing apparatus and in operative position it is submerged in a bath of molten glass as shown in U. S. Patent No. 2,303,805.

The mold structure includes a base in the form of a horizontal platform 14 of sheet metal resting upon a series of I-beams 15 which can be welded or otherwise secured thereto. For convenience in description the I-beams can be referred to as being disposed transversely of the length of the mold structure, although the mold structure can be in a form other than oblong.

Likewise, a series of transverse spaced beams 16 are mounted on edge upon the upper side of the platform 14, and extend inwardly from opposite marginal portions of this platform in such manner that inner ends of the beams are spaced materially from one another in substantially opposed relation. The upper edges of these beams are inwardly and downwardly inclined toward their inner ends and are secured rigidly upon the platform 14 by means of conventional fasteners, such as bolts 19, extending therethrough and through the platform.

The mold matrix 11 defining the cavity 12 is composed of porous plaster material, such as plaster of Paris, and is mounted upon the beams 16. This matrix is sectional in form and includes parallel spaced base sections 20 between which a relatively narrow trough section 21 is fitted. A flaring rib-forming groove 22 extends substantially the length of the trough section and opens upwardly. The trough section also includes a metal channel member 23 containing a relatively long central plaster of Paris section 24 abutted by removable end sections 25 extending in opposite directions in the opposite end portions of the channel member 23. The central trough section 24 is formed directly in the metal channel member 23, or it can be otherwise permanently cemented therein, while the end sections 25 are removably mounted in the channel member.

Suitable retaining blocks 26 disposed in the end portions of the channel member 23 are bolted therein, as indicated at 29, and abut against the opposite outer ends of the end sections 25 to hold them in assembled relation. The side walls of the bottom trough section 21 converge upwardly and fit in wedging relation against the inner edge walls of the flanking base sections 20. The space between the inner edges of the base sections 20 is thus closed by the trough section and the adjoining sides of the latter conform in precisely fitting relation to these sides of the trough section. In mounting these elements in the relationship described, transverse bars 30 which are provided with metal wedging facings 31 are formed with inclined inner end portions to receive these facings. These bars can be moved inwardly from opposite directions against the lower portions of the channel member 23 which forms a part of the trough section 21 to force the latter upwardly into position. The surfaces in the bottom of the cavity 12 along the joints between the trough section 21 and each adjacent base section 20 are flush and so closely fitted as to insure substantially continuous smoothness across these joints.

Likewise, opposite end wedge members 32 also having wedging metal facings 34 on upper inclined sides thereof, can be forced inwardly from opposite ends of the trough member. These wedge members 30 and 32 cooperate to insure exact fitting of the trough section 21 between the base sections 20.

Four corner sections 35 composed of plaster of Paris are disposed in pairs at opposite ends of the mold structure and they are designed to embrace at their outer portions the outer end portions of the end sections 25. These sections function in conjunction with end blocks 36 which rest upon the platform 14 and are arranged in pairs on opposite sides of the trough section 21 in closely fitting relation thereto. Side wall sections 39, also of plaster of Paris, rest upon the upper surfaces of the base sections 20 and are abutted at their opposite ends by the inner ends of the four corner sections, respectively. It is to be noted that the four corner sections 35 extend at their outer portions beyond the base sections 20 and that the adjacent blocks 36 are cut away, as indicated at 40, adjacent the lower inner extremities thereof. The inner upper ends of the corner sections 35 are sufficiently elevated to overlap and rest upon the upper surfaces of the base sections 20 adjacent the outer end portions thereof. It should be understood that these four corner sections 35 fit closely about the outer end portions of the base sections 20, as well as about the end sections 25 as described.

An angle iron frame 41 of polygonal form surrounds the four corner sections 35 and the side walls 39 which constitute a substantially continuous enclosure around the upper portion of the refractory body 13 as it is contained in the cavity 12. Suitable anchoring means, such as bolts 42, secure the frame horizontally upon the upper marginal portions of the base sections 20. One flange 43 of each angle iron section extends upwardly and constitutes gauging means along which the side sections and end sections of the plaster of Paris are fitted to facilitate the assembly of the sections 35 and 39 precisely into their proper positions. The plaster of Paris sections 20, 21 (including the end trough sections 25), 35, and 39 form the matrix 11 into which the body of refractory clay products is poured in wet form to a level indicated at 45. That is, the cavity 12 is filled substantially to the brim.

An additional block 46 of plaster of Paris is fitted between the corner sections at each end of the mold structure in order to properly shape the reduced end portions 49 of the refractory body 13. Each block 46 is suspended upon a horizontally disposed metal strap 50 that is bolted to the upper sides of the corner sections 35 and to the block, as indicated at 51. If desired, these blocks 46 and the corner sections 35 at each end of the mold structure can be removed as a unit, or the sections 35, blocks 46, straps 50, and side walls sections 39, can be disassembled and removed separately. It is also to be understood that the bolts 42 can be removed from the angle bar frame and the latter can be removed from the base sections 20.

It is to be noted that the groove 22 is continuous from the central plaster section 24 in opposite directions into the end sections 25 of the trough section 21. This groove defines the shape of a relatively narrow central rib 52 that extends longitudinally of the draw bar and is flanked by convex ridge portions 53 also extending longitudinally of the draw bar and sloping downwardly in opposite directions from the rib 52.

A batch of clay products is mixed in a suitable mixer (not shown) and contains approximately 10% to 20% water so as to be in condition to pour freely into the mold matrix 11. The wet batch flows into all of the depressions and cavities of the mold and settles closely against the plaster of Paris surfaces which are so smoothly formed as to be of substantially polished nature. Water from the wet clay products enters the pores of the plaster of Paris and carries small particles of the batch material against the mold surfaces to form an exact replica of the plaster surfaces. Approximately 2% of the water is taken up by the plaster of Paris. This action of the water and clay products produces a very smooth refractory surface as compared to refractory surfaces which have been ground and carved in finishing draw bars by previously practiced methods.

The plaster mold arrangement is such that the convex ridge portions 53 and the central rib 52 of the draw bar body are initially in reversed position. That is, the convex ridge portions and central rib are in such position as to face downwardly, whereas in their normal position in a drawing chamber they face upwardly. In this manner, the wet mud-like batch can flow into the recesses defining the rib 52 and other irregular contours defining the various portions of the draw bar. In this position of the draw bar, the flat surface 54 facing upwardly is not precisely molded. It is leveled off after the pouring operation and later is ground away to such extent and smoothness as may be required. This surface 54 is actually the bottom of the draw bar when the latter is installed for operation and it does not require the finished smoothness that is desired for the side of the draw bar defining the convex ridge portions 53 and rib 52. In the normal operative position of these portions, the molten glass flows over them incidental to the formation of the glass sheet in a drawing chamber.

After the batch of wet clay products has been poured into the matrix 11, the mold structure is covered with blankets in contact with the upper area 54 to retard and control the drying of the refractory body. These blankets can be composed of a layer of burlap dampened to considerable degree. Then a layer of moisture impervious fibrous material, such as sisal paper, covers the dampened burlap, then a third layer of relatively dry burlap covers the paper.

The upper side 54 of the refractory body is maintained in a relatively wet and soft condition while the rib portion becomes solidified sufficiently to retain its shape before it can become distorted by the shrinkage of the central mass of the refractory unit. Consequently continued and complete drying can be achieved without material distortion of the body. In this connection, whatever distortion that occurs is controlled, at least to a great degree and is distributed so as to maintain the rib portions, or critical areas, precisely shaped, while the side which is moist and relatively soft can distort and in doing so can permit volume shrinkage to take place without involving internal cracking of the refractory body.

Water is lost or absorbed into the bottom and sides of the plaster of Paris mold, and also water is evaporated from the relatively wide area 54 facing upwardly from the mold cavity. Evaporation is retarded by the burlap and paper blankets in order to maintain the refractory body in proper contact with the mold surfaces. If the refractory body were permitted to dry without this control, there would be differentials in shrinkage in different portions of the body and the rib portion would be warped and probably broken. It has been found that considerable difficulty is involved in preventing the refractory body from shrinking in such manner that the end portions thereof would pull upwardly away from the mold. Other distortion would occur if careful control were not exercised in drying and curing the refractory as specified herein.

After the initial retarded and controlled evaporation has been continued for approximately four days, the refractory body will then have been set sufficiently to permit the removal of the side wall sections 35 and 39. However, in order to further control the shrinkage of the refractory and to prevent warping or distortion thereof, it is again covered by the blankets. Since no precise molding is effected along the flat base surface 54 of the draw bar, the evaporation through this surface can be controlled with considerable freedom. Any slight distortion which may occur during the relatively slow curing processes can be substantially concentrated in this area.

After expiration of 12 to 18 days from the pouring of the wet batch, the trough section 21 is removed by withdrawing the wedge members 30 and 32 and permitting the section 21 to be lowered from its position between the inner edges of the base section 20. During this 12 to 18 day period, the drying is controlled to insure uniform setting of the rib 52 and the convex portions 53 adjacent thereto. At the completion of this period, the control of drying to produce uniform setting of the clay body is continued in order to prevent cracking or other failure thereof. The application of the dampened and drying blankets as described above is continued.

It is to be understood that the central mass of refractory body is the last to shrink and in shrinking it tends to distort or actually does distort one of the other surfaces. By means of the controlled drying in the application of blankets, whatever distortion that occurs is substantially taken up in the top area 54.

These aspects of the invention are important factors in the molding operations, especially with reference to the formation of the rib 52. The wet clay mass flowing into the mold forms this rib 52 as an exact replica of the portion of the mold in which it is formed, and as a result of the water flowing into the plaster of Paris wall of the mold, the body of wet clay stiffens. It becomes more and more rigid as it loses more water. It is important to maintain the top of the clay body, that is, the area 54, in such moisture controlled condition and sufficiently soft that the shrinkage of the central mass does not distort the rib, but as the molded body loses more and more water the shrinkage of the central mass thereof tends to pull the top downwardly and the bottom or rib portion upwardly. For these reasons the rib forming trough section 21 is removed so as to accelerate the drying of the rib 52, thus increasing its rigidity and also forcing all of the vertical distortion due to shrinkage of the central mass to take place along the top area 54 of the body.

The matter of timing is an important factor in the procedure of removing the trough section 21, or other portions of the mold. Variations in atmospheric drying conditions will, of course, vary the time intervals between the pouring of the wet clay and the succeeding steps following this operation.

This treatment, including the control effected by the blanket coverings, is continued for 40 to 60 days after the initial pouring of the batch materials and then the unit, from its position of support upon the base sections 20, is turned over so that the rib 52 faces upwardly and the refractory body is placed upon a bed of sand or upon other weight equalizing support. In this way the final drying operations can be accelerated.

After the period of shrinkage of the refractory body is substantially completed and the critical stages with reference to the prevention of distortion of the rib and other portions is past, then artificial heat can be applied by suitable electric heaters, for example, in the value of approximately 1,000 watts. These heaters are placed beneath the refractory body and operate, while the blankets are still covering it, to accelerate the removal of the remaining particles of moisture.

The curing of the refractory is still continued under cover of the blankets of burlap and impervious paper to the end of a period of 90 to 120 days from the date of initial pouring of the batch. The refractory is then ready for firing. It is transported to the vicinity of the plant where it is to be installed and as near the point of final installation as possible. The refractory is still in a so-called green condition.

In firing the refractory, heat is applied slowly and gradually to drive off atmospheric moisture. This moisture is dissipated at approximately 212° F. The heating of the refractory is continued gradually to drive off water of crystallization and water of hydration at approximately 1000° F. Then the heating is continued so as to reach a temperature value of 2500° F. to 2600° F. After complete firing of the refractory, it is transferred immediately to a drawing chamber for installation with as little loss of the heat as possible. The temperature of the draw bar should not fall below a minimum of 1800° F. even during the installation thereof and, of course, after the installation and submersion in a molten glass bath, the temperature will remain in conformity with the temperature of the molten glass.

Although considerable structural details of the preferred embodiment of the mold involving the invention have been shown and described in detail, it will be apparent to those skilled in the art that the invention is not so limited, but that various changes can be made therein without departing from the spirit and/or scope of the invention as exemplified in the appended claims.

I claim:

1. In a sectional mold structure, a horizontal platform, a pair of spaced base mold sections having opposed inner edge flat surfaces diverging downwardly, spaced transverse members on said platform and spacedly supporting the pair of base mold sections above said platform, the opposed inner edges of said transverse members being spaced apart, a longitudinal mold section having longitudinal sides with flat top portions converging upwardly and removably fitting in wedging relationship between said downwardly diverging surfaces of said pair of mold sections, transverse wedge members disposed between said spaced transverse members and having top surface portions downwardly inclined toward and adjacent their opposed inner edges, said wedge members being supported on said platform and the inclined top surface portions engagedly supporting said longitudinal mold section, and side and end mold sections above the spaced base mold sections and the end portions of said longitudinal mold section and defining with said base and longitudinal mold sections an upwardly opening mold matrix for shaping moldable material, said mold sections being formed of plaster of Paris.

2. The mold structure of claim 1 and further including an elongated metal channel member, said longitudinal mold section being mounted in said channel member with the flat top portions of the longitudinal sides of said mold section being above the flanges of said channel member, and the inclined top surface portions of the wedge members engagedly supporting said channel member to support said longitudinal mold section.

3. The mold structure of claim 2 wherein the bottom surfaces of the base mold sections are downwardly inclined toward their opposed inner edges and wherein the inner portions of said downwardly inclined bottom surfaces of the base mold sections are engaged by the inclined top surface portions of the wedge members engaging the bottom of said channel member.

4. The mold structure of claim 3 wherein the top surface of the longitudinal mold section is positioned by said wedge members to provide a flush mounting with the pair of base mold sections and wherein the top surface of the longitudinal mold section has a groove longitudinally disposed therein.

References Cited in the file of this patent

UNITED STATES PATENTS

| | | |
|---|---|---|
| 137,901 | Elliot | Apr. 15, 1873 |
| 767,829 | Ozee | Aug. 16, 1904 |
| 1,250,233 | Sheaver | Dec. 18, 1917 |
| 1,522,703 | Ruys | Jan. 13, 1925 |
| 1,645,766 | Sanson | Oct. 18, 1927 |
| 2,571,417 | Buchanan | Oct. 16, 1951 |

FOREIGN PATENTS

| | | |
|---|---|---|
| 11,204 | Denmark | Aug. 25, 1908 |